Nov. 5, 1968  H. BOSSELAAR ETAL  3,409,897
RECORDER FOR DETECTING AND LOCATING LEAKS IN
PIPELINES BY ULTRASONIC VIBRATION
Filed Dec. 19, 1966

TRAVEL ⟶

INVENTORS:
H. BOSSELAAR
A. J. RIEMSDIJK
BY:
*[signature]*
THEIR ATTORNEY

United States Patent Office 3,409,897
Patented Nov. 5, 1968

3,409,897
RECORDER FOR DETECTING AND LOCATING LEAKS IN PIPELINES BY ULTRASONIC VIBRATION
Hendrik Bosselaar and Arnoldus J. Van Riemsdijk, Amsterdam, Netherlands, assignors to Shell Oil Company, New York, N.Y., a corporation of Delaware
Filed Dec. 19, 1966, Ser. No. 602,628
5 Claims. (Cl. 346—33)

ABSTRACT OF THE DISCLOSURE

An apparatus for detecting and locating leaks in a pipeline wherein an instrument housing is transported through the pipeline by the fluid flow. The instrument housing contains means for detecting the vibrations caused by fluid leaking from the pipeline and suitable means for amplifying and recording the vibrations that occur in the ultrasonic range.

---

The invention relates to an apparatus and method for detecting and locating leaks in pipelines.

It is well known that leaks develop in pipelines and, particularly when small leaks are involved, are often difficult to detect. The quantity of matter, for instance oil, which escapes through a small leak is usually negligible in relation to the quantity transported through the line. It is necessary that such leaks be detected, because they may increase in size. Also, it is often of great importance to prevent pollution of water or soil surrounding a pipeline. Even small leaks may be very harmful to a watershed area supplying water to be used as drinking water or irrigation water.

One known method for detecting leaks is the use of equipment in the form of a pipeline pig that is transported through the pipeline with the flow through pipeline. The pig contains instruments for detecting and locating leaks. The inspection of the pipeline takes place on the inside, which permits cheap and rapid inspection of pipelines, particularly where they are located in inaccessible areas or buried.

In U.S. Patent 2,884,624 the audible noise produced by matter flowing from a leak is detected and recorded with the aid of equipment transported through the pipeline. This method has the serious disadvantage that the noise from a leak must be observed in an environment where many other audible noises are present. These noises are produced mainly by the flowing fluid in the pipeline, by pumps and by the scraping of the pig against the wall. As a result it is often impossible to detect the audible noise produced by the leak.

It has been found that these disadvantages may to a large extent be eliminated by detecting the ultrasonic vibration produced by the escape of fluid from the pipeline. It has been found that the background noise in a pipeline contains few ultrasonic vibrations. On the one hand this is a result of the fact that the sources, mentioned hereinbefore, of disturbing noises contain few if any ultrasonic vibrations, while, on the other hand, the absorption and the scatter of ultrasonic vibrations in a medium such as oil are larger than those of audible vibrations. The net result is that the intensity of the ultrasonic vibrations on average has a lower level than audible or sonic vibrations.

It has further been found that leaks in a pipeline generate, in addition to audible noise, strong ultrasonic vibrations that contain a maximum or resonant frequency. If the leak is considered a resonance cavity, then, for small leaks and the commonly used wall thicknesses of a pipeline, the resonance frequencies of a leak are in the ultrasonic range. If the detecting equipment is rendered sensitive for the detection and processing of ultrasonic vibrations, it is ensured that the signal generated by a leak can be observed against a background of disturbing vibrations even if it has only a low density. As a result, the risk of erroneous observations is decreased and the sensitivity of the instrument increases over those obtained using audible vibrations.

According to another feature of the invention the performance of the equipment is improved by designing the casing or pig for the equipment so that it can be transported through the pipeline without contacting the walls. The casing must be fluid tight to prevent the penetration of the fluid, for instance oil. The microphone or transducer used for detecting the acoustic vibrations may be located inside but is preferably outside the casing.

In addition to detecting the location of a leak, it is desirable to check the equipment for proper operation. For, besides detecting the presence of leaks it is at least of equal importance to determine the absence of leaks with certainty. If, after the journey of a transport unit through the pipeline, which journey may take many days, no records of leaks are found, one may still not be certain that the equipment was working continuously. The great importance of the determination of the absence of leaks is manifest particularly in the case of pipelines traversing residential areas, arable land or watershed areas.

The invention provides a means by which both the testing and the locating may be carried out in a simple manner. According to the invention sources of vibrations are present at specific places on the outside of the pipeline which are capable of generating acoustic vibrations whose strength and frequencies are such that these vibrations can be observed by the equipment. Properly working equipment will record these sources of vibrations when passing them and remove the uncertainty regarding the proper functioning of the equipment. This also simplifies the locating of a leak since the leak will be confined to the interval between two successive sources of vibrations. In addition the apparatus may include time recording to calibrate the recording and assist in locating a leak. The sources of vibrations provide a signal similar to a leak and their function in determining the location of a leak might be referred to as mile posts although, naturally, the interval between two successive sources is different from a mile and will generally be larger. As the location of these sources is precisely known, it is impossible for a misunderstanding to arise in the interpretation of the records.

The invention and its advantages will be better understood from the following description of a preferred embodiment when taken in conjunction with attached drawings in which.

Figure 1:
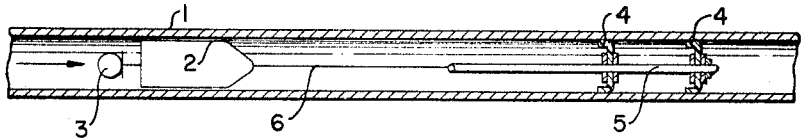
FIGURE 1 is an elevation view of a preferred form of invention positioned in a pipeline.

Prior devices designed for inspecting the interior pipelines have always relied upon cup-shaped pistons fitting closely the interior of the pipeline to transport the inspection device through the pipeline. In fact, the prior inspection devices appeared very similar in design to scrapers or pigs that are periodically sent through pipelines to remove wax and other deposits from the inner surface of the pipeline. While the use of cup-shaped pistons that drag along the inner wall of the pipeline is possible with some inspection devices, they generate considerable noise. This cannot be tolerated in the present invention which depends upon the detecting of ultrasonic vibrations caused by the escape of fluid from the pipeline. The background noise generated by the normal cup-shaped pistons would substantially block out the desired signals. This difficulty has been overcome in the present invention by providing a freely floating casing for housing inspection tool as shown in FIGURE 1. The casing 2 of the inspection tool is a cylindrically shaped hollow member having a length to diameter ratio of at least two. Further the front or leading edge of the cylindrical casing is provided with a conical-shaped piece to improve its flow through the pipeline 1. To assist in propelling the the casing through the pipeline the rear of the casing is substantially flat in order that the impacting of the fluid flow on the flat surface will propel the casing through the pipeline.

When a casing is constructed as shown in FIGURE 1 the specific gravity should be made substantially equal to the fluid flowing in the pipeline. If the specific gravity is substantially equal to the fluid in the pipeline the casing will tend to move to the center of the pipeline. This results from the fact that the velocity of the flowing fluid is smaller along the wall of the pipeline than in the center. Thus, it is seen that if the casing is made relatively long with respect to its diameter and it has a gravity substantially equal to the fluid it can be transported through the pipeline without bumping or scraping on the walls of the pipeline 1.

It has also been discovered that if the ratio between the diameter of the casing and the interior diameter of the pipeline is chosen between tthe limits of 0.7 and 0.9 the casing will be readily transported through the pipeline and substantially all bumping or rubbing against the walls of the pipeline will be eliminated. Additional improvement can be obtained by designing the center of gravity of the casing to be off the center line of the casing. This can easily be done by mounting all of the equipment to one side of the center line of the casing. When the center of gravity is spaced from the center line or longitudinal axis of the casing, the casing will assume a particular orientation. This will then permit the determination of the circumferential position of the detected leaks. The circumferential position of the various detected leaks can be determined by using two or more microphones 3 to detect the sonic vibrations. The microphones 3 can be oriented in a particular manner and a signal from all three microphones recorded in a correlatable manner.

Since the casing is propelled through fluid-filled pipelines it is, of course, necessary to make the casing fluid tight. Further the casing can be formed of any material providing the specific gravity of the overall tool can be controlled so that it substantially equals the fluid flowing in the pipeline. In this regard sealed aluminum casing can be used.

If it is desired to propel the casing through the pipeline at substantially the flow rate of the fluid in the pipeline, a transporting means may be used. A transporting means consists of a series of cup-shaped pistons 4 mounted on a solid rod 5 as shown in FIGURE 1. The assembly of the cup-shaped pistons and the solid rod 5 are attached to the casing 2 by means of a flexible cable 6. With this arrangement the assembly of the cup-shaped pistons and rod 5 will be transported at the same rate as the fluid flowing in the pipeline and will pull the casing along behind it. Separation between the cup-shaped pistons and the casing can be made sufficiently long to insure that any sonic vibrations generated by the pistons will substantially disappear before the casing 2 and microphones 3 approach the location of the sonic vibrations.

The combination shown in FIGURE 1 provides the benefits of a freely floating casing for the instrument and microphones 3 while retaining the advantages of an inspection device that travels through the pipeline at substantially the flow rate of the fluid in the pipeline. It is desirable at times to have the instrument travel at the flow rate of the fluid to permit correlation between the record of the instrument and the approximate position of the instrument at a particular time. From this correlation a determination of the approximate location of leaks detected by the tool can be obtained.

Figure 2:
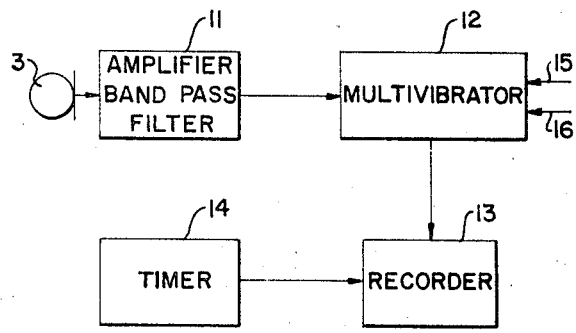
FIGURE 2 is a block diagram of the detecting and measuring circuits included in tool shown in FIGURE 1.

Referring now to FIGURE 2 there is shown in block diagram form a circuit for use with this invention. The circuit shown in FIGURE 2 is, of course, mounted in the casing 2 shown in FIGURE 1. The circuit utilizes a microphone 3 must be a fluid-tight microphone, preferably of the hydrophone type. In addition, the microphone 3 preferably has its maximum sensitivity substantially 35 kc./s. The microphone may be a conventional crystal type microphone or be a magneto-strictive type of microphone that is commonly used in hydrophones used for performing well surveys. The microphone is coupled to an amplifier 11 that is provided with a band pass filter in its input circuit. As explained above, maximum ratio between the signal generated by a leak and a background noise occurs at approximately 35 kc./s. Thus, the band pass filter is designed to pass this frequency and discriminate against all other frequencies. The particular type of amplifier 11 will of course depend upon the type of microphone 3 used and in addition it may be necessary to utilize an impedance-matching device in the input circuit of the amplifier 11.

The amplifier 11 is connected to a trigger circuit 12 that is designed to operate whenever the amplitude of the signal from the amplifier 11 exceeds a certain preset background level. The trigger circuit 12 is designed to operate at a certain signal level and supply a single pulse output in response to the signal. For example, circuit 12 may be a conventional amplifier having a sensitivity control for discriminating against background noise or maybe a monostable multivibrator that is set to trigger at a particular input level. The circuit 12 may also comprise a relay that is adjusted to close at a certain signal level. The circuit 12 is connected to a recorder 13 that is preferably a chart recorder driven at a fixed rate of speed by means of a timing device 14. Thus, if the casing 2 is moved through the pipeline at a rate substantially equal to the flow rate of the fluid in the pipeline, the record can be easily correlated with the flow rate to locate the exact position of leaks in the pipeline.

The combination of an amplifier having a band pass filter in its input circuit and the triggering circuit 12 with a recording element driven at a constant rate provides a high degree of accuracy in the recording. The amplifier as explained should be adjusted to pass only the frequency band at 35 kc./s. and suppress all other frequencies particularly the frequency of the background noise. The triggering circuit 12 should have an adjustable level 16 so that the sensitive level can be adjusted to exceed the level of background noise.

The use of a timing device to drive the chart recorder at a constant rate permits easy determination of the location of any leak indicated on the recording. Since the rate of flow of the fluid through the pipeline is known one can then convert the record travel into actual travel along the pipeline. For example, if one can measure an interval on the record with an accuracy of 10 seconds then one can locate a leak within approximately 300 feet, where the total travel of the tool is approximately 60 miles.

Figure 4:
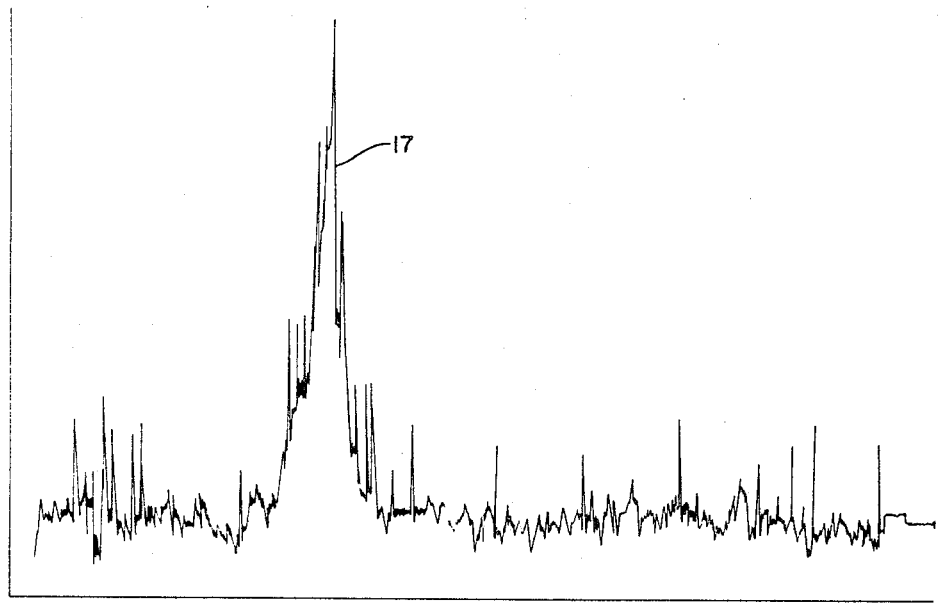
FIGURE 4 is a section of a chart record made by the equipment shown in FIGURES 1–3.

The actual record obtained with the tool described above is shown in FIGURE 4. In the record shown the travel is recorded along the horizontal axis while the signal amplitude is recorded along the vertical axis. The large peak 17 is the result of a slit-shaped peak and the type wall. The leak had a dimension of 0.019 x .006 inch while the wall of the pipe was 0.35 inch. Crude oil was pumped through the pipeline at a rate of 5 ft./sec. at a pressure of 340 p.s.i. and the leak produced 14 gal./hr. crude oil. From the record of FIGURE 4 is is seen that the leak produces a peak which clearly rises above the background noise and thus permits ready detection of the leak in the pipeline.

In addition to the above it has been found possible to detect cylindrical holes in a pipeline having a diameter as small as 0.006 inch with a pipe wall only ⅛ of an inch thick. Thus, it is seen that the method of this invention using an apparatus which discriminates against all frequencies other than 35 kc./s. provides a highly sensitive instrument that is capable of detecting minute holes in pipelines.

Figure 3:
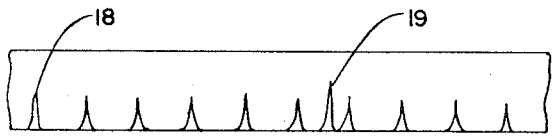
FIGURE 3 is a means for testing the tool shown in FIGURE 1.

In normal operation the instrument will travel over relatively long distances in the neighborhood of 50-75 miles between pumping stations. Traveling over such long distances the end of the travel in the record is removed and inspected. It may indicate that no leaks were present in the pipeline. Due to the length of travel there will always be doubt or uncertainty as to whether the instrument functioned properly. Shown in FIGURE 3 is the type of record that is obtained when artificial sound sources are placed along the pipeline. The artificial sound sources produce vibrations that appear as signals 18 on the record. The artificially produced signals will occur at regular intervals or at least at known intervals along the record. In contrast, a leak in the pipeline will occur at an odd interval and produce a peak as shown at 19. Thus, it can easily be ascertained that the instrument was properly functioning when it traveled through the pipeline. The artificial sound sources can consist of any device which is capable of introducing vibrations to the wall of the pipeline. These sound sources are preferably located at equal intervals along the pipeline, for example every mile.

In addition to providing a ready means for accurately determining the proper functioning of the instrument, the artificial sound sources also provide a means for determining the exact location of the leak. Since the artificial sound sources are located at fixed intervals and known positions, it is a simple matter to locate the leak between two of the artificial sound sources.

While the leak-detecting instrument of this invention has been described with relation to a particular construction, it is obvious that many changes may be made without departing from the scope of this invention. For example, if more accurate location of the leak is desired it would be possible to incorporate in the instrument a magnetic means for detecting the positions of weld joints in the pipeline. Thus, if the weld joints are uniformly spaced along the pipeline one can accurately determine the exact location of any leak. In addition, other types of artificial markers may be placed on the pipeline with reference points from which the location of a leak may be determined. The important feature of this invention is the use of a detecting instrument that responds primarily to vibrations in the 35 kc./s. range. This greatly improves the signal-to-noise ratio and results in the detection of very small leaks.

We claim as our invention:

1. An apparatus for detecting and locating leaks in a pipeline comprising:
   a casing, said casing being adapted for transport through the pipeline by the fluid flow through the pipeline;
   a vibration-sensing means, said sensing means being mounted on said casing;
   an amplifier, said amplifier having a band pass in the range of 20 to 150 kc./s., said sensing means being coupled to said amplifying means; and
   trigger circuit means, said trigger means being coupled to said amplifier, said trigger means having a sensitivity level, said sensitivity level being set above the background noise level; and
   a recording means, said recording means being driven at a predetermined rate, said amplifying means being coupled to said recording means, whereby only signals that exceed the sensitivity level of the trigger circuit are recorded.

2. The apparatus of claim 1 wherein the casing has a diameter between 0.7 and 0.9 of the diameter of the pipeline and a specific gravity substantially equal to the specific gravity of the fluid in the pipeline.

3. The apparatus of claim 1 and in addition a plurality of sound sources, said sound sources being placed along said pipeline at known positions to provide both marker locations and test signals for the apparatus.

4. The apparatus of claim 2 and in addition a transporting member, said transporting member comprising a frame member and at least one resilient, cup-shaped member mounted on said frame member, said transporting member being coupled to said casing by a flexible means.

5. The apparatus of claim 1 wherein the center of gravity of said casing is spaced from the longitudinal axis of the casing.

References Cited

UNITED STATES PATENTS

| | | | |
|---|---|---|---|
| 2,884,624 | 4/1959 | Dean et al. | 340—282 |
| 3,045,116 | 7/1962 | Gant | 250—43.5 |
| 3,162,505 | 12/1964 | Hall | 346—33 |
| 3,192,516 | 6/1965 | Simpkins et al. | 73—40.5 X |

RICHARD B. WILKINSON, *Primary Examiner.*

J. W. HARTARY, *Assistant Examiner.*